(12) United States Patent
Reinhart et al.

(10) Patent No.: US 10,859,163 B2
(45) Date of Patent: Dec. 8, 2020

(54) MULTI-LAYER GASKET PRESSURE RELIEF DEVICE

(71) Applicant: Ford Global Technologies, LLC, Dearborn, MI (US)

(72) Inventors: Paul Reinhart, Livonia, MI (US); John Riegger, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 16/109,315

(22) Filed: Aug. 22, 2018

(65) Prior Publication Data

US 2020/0063866 A1  Feb. 27, 2020

(51) Int. Cl.
| | | |
|---|---|---|
| F16J 15/08 | (2006.01) | |
| F02F 11/00 | (2006.01) | |
| F01M 11/02 | (2006.01) | |
| F02F 7/00 | (2006.01) | |

(52) U.S. Cl.
CPC .......... *F16J 15/0818* (2013.01); *F01M 11/02* (2013.01); *F02F 7/0002* (2013.01); *F02F 11/002* (2013.01); *F01M 2011/022* (2013.01); *F16J 2015/0868* (2013.01); *F16J 2015/0875* (2013.01)

(58) Field of Classification Search
CPC ............ F16J 15/0818; F16J 2015/0868; F16J 2015/0875; F01M 11/02; F01M 2011/022; F02F 7/0002; F02F 11/002
See application file for complete search history.

(56) References Cited

U.S. PATENT DOCUMENTS

| | | | | |
|---|---|---|---|---|
| 5,280,769 A | * | 1/1994 | Yates | ............... F02M 35/10144 |
| | | | | 123/184.54 |
| 6,349,945 B1 | | 2/2002 | Schmucker et al. | |
| 7,137,361 B2 | | 11/2006 | Vialard et al. | |

FOREIGN PATENT DOCUMENTS

| | | | | |
|---|---|---|---|---|
| DE | 102004031458 A1 | 1/2006 | | |
| FR | 2983915 A1 | 6/2013 | | |
| JP | 61207861 A | * | 9/1986 | ............ F02F 11/002 |
| JP | 2006125312 A | 5/2006 | | |
| JP | 4783606 B2 | 9/2011 | | |
| KR | 20020015735 A | 3/2002 | | |
| KR | 100356054 B1 | 10/2002 | | |

* cited by examiner

*Primary Examiner* — Gilbert Y Lee
(74) *Attorney, Agent, or Firm* — Geoffrey Brumbaugh McCoy Russell LLP

(57) ABSTRACT

Methods and systems are provided for a multi-layered steel gasket for an internal combustion engine. In one example, a system may include a pressure relief device arranged in the multi-layered steel gasket for releasing pressure from one or more fluids flowing through passages of the internal combustion engine.

14 Claims, 4 Drawing Sheets

MULTI-LAYER GASKET PRESSURE RELIEF DEVICE

FIELD

The present description relates generally to a gasket comprising a pressure relief device for an internal combustion engine.

BACKGROUND/SUMMARY

Internal combustion engines may form a combustion chamber using two engine components, such as a cylinder head and a cylinder block. A deck face of the cylinder block may cooperate with a deck face of the cylinder head to enclose the combustion chamber. A sealing member, such as a head gasket may be positioned between the deck faces of the block and head to seal the combustion chamber during engine operation.

One example of the sealing member (e.g., the head gasket) may include a multi-layered gasket. The multi-layered gasket may comprise first and second outer layers with an intermediate layer arranged optionally therebetween.

However, the inventors herein have recognized potential issues with such systems. As one example, the primary focus of multi-layered gaskets may be to form a seal between the head and the block, thereby preventing the leakage of one or more of combustion gases, coolant, lubricant, and the like. Additionally, multi-layered gaskets may comprise one or more apertures for flowing fluid from the block to the head.

In one example, the issues described above may be addressed by a system comprising an engine comprising a cylinder head and a cylinder block with a multi-layer gasket arranged between the cylinder head and the cylinder block, the multi-layer gasket comprising an interstitial space between layers shaped to flow fluids toward a pressure relief device integrally formed within the multi-layer gasket. In this way, the interstitial space may be utilized to decrease packaging constraints.

As one example, the multi-layer gasket may comprise a first side and a second side sandwiching a hollow space. The hollow space may be shaped to receive fluid from one or more apertures of the multi-layer gasket. The one or more apertures may be shaped to flow fluid from a cylinder block to a cylinder head, wherein one of the hollow space may divert a portion of the fluid to the pressure relief device. The pressure relief device may open in response to a fluid pressure being greater than a predetermined pressure, wherein some amount of fluid may flow through the pressure relief device and out of the multi-layer gasket without flowing to the cylinder head.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4B are shown approximately to scale, although other relative dimensions may be used, if desired.

DETAILED DESCRIPTION

Figure 2:
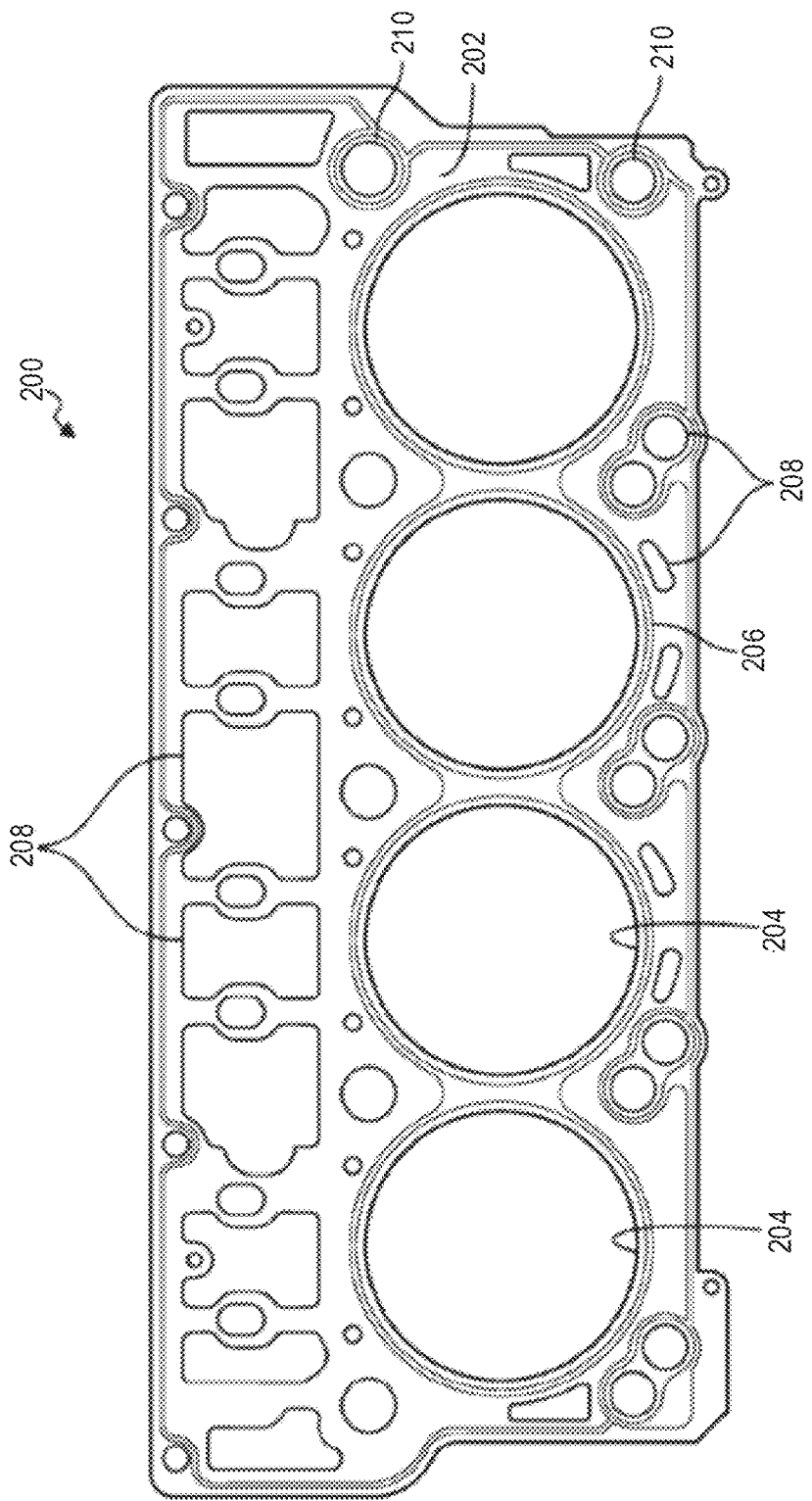
FIG. 2 shows a perspective view of a multi-layer gasket included with the engine of FIG. 1.
Figure 3A:
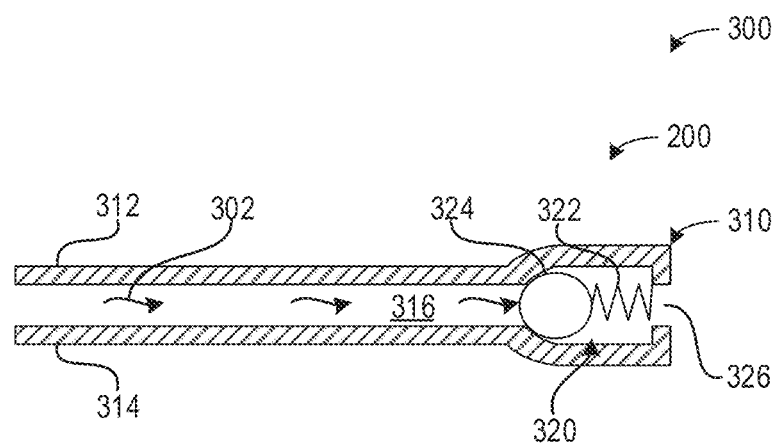
FIGS. 3A and 3B show closed and open positions of a first embodiment of a pressure relief device arranged in the multi-layer gasket of FIG. 2, respectively.
Figure 3B:
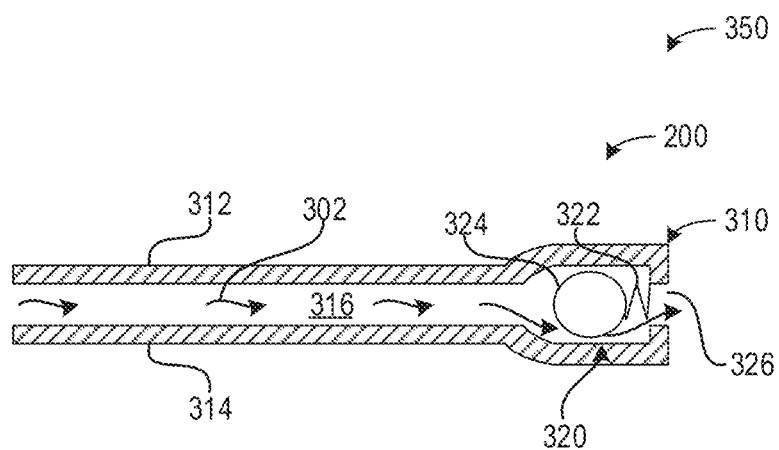
Figure 4A:
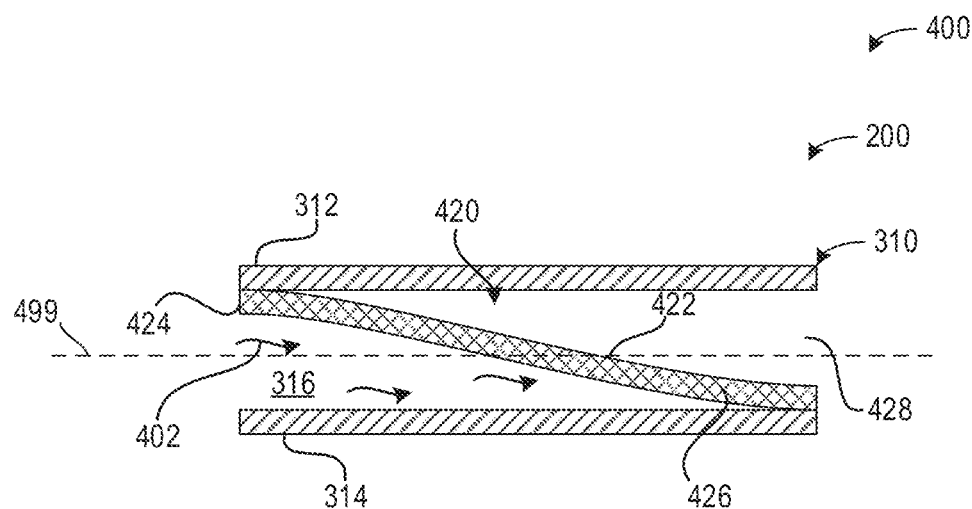
FIGS. 4A and 4B show closed and open positions of a second embodiment of a pressure relief device arranged in the multi-layer gasket of FIG. 2, respectively.
Figure 4B:
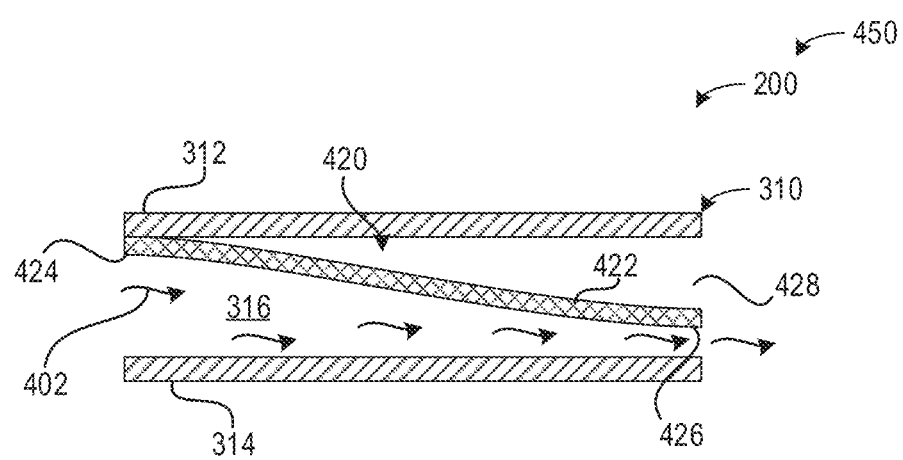

The following description relates to a multi-layer gasket pressure relief device. The multi-layer gasket may be arranged between a cylinder head and a cylinder block of an engine, such as the engine of FIG. 1. The multi-layer gasket may comprise a first side and a second side, with a plurality of apertures extending therebetween for fastening the gasket to the head and the block and for flowing fluids from the head and the block, as shown in FIG. 2. An interstitial space may be arranged between the first side and the second side, where portions of the interstitial space comprising a pressure relief device may divert some fluids from the apertures to the pressure relief device. Embodiments of the pressure relief device are illustrated in FIGS. 3A, 3B, 4A, and 4B. If a pressure of the fluid is less than a predetermined pressure, then the pressure relief device may remain closed, as shown in FIGS. 3A and 4A. If the pressure of the fluid is greater than or equal to the predetermined pressure, then the pressure relief device may open, as shown in FIGS. 3B and 4B, where the fluid may flow out of the multi-layer gasket without flowing to the cylinder head FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 3A, 3B, 4A, and 4B shows arrows indicating where there is space for gas and/or liquid to flow, and the solid lines of the device walls show where flow is blocked and communication is not possible due to the lack of fluidic communication created by the device walls spanning from one point to another. The walls create separation between regions, except for openings in the wall which allow for the described fluid communication.

Figure 1:
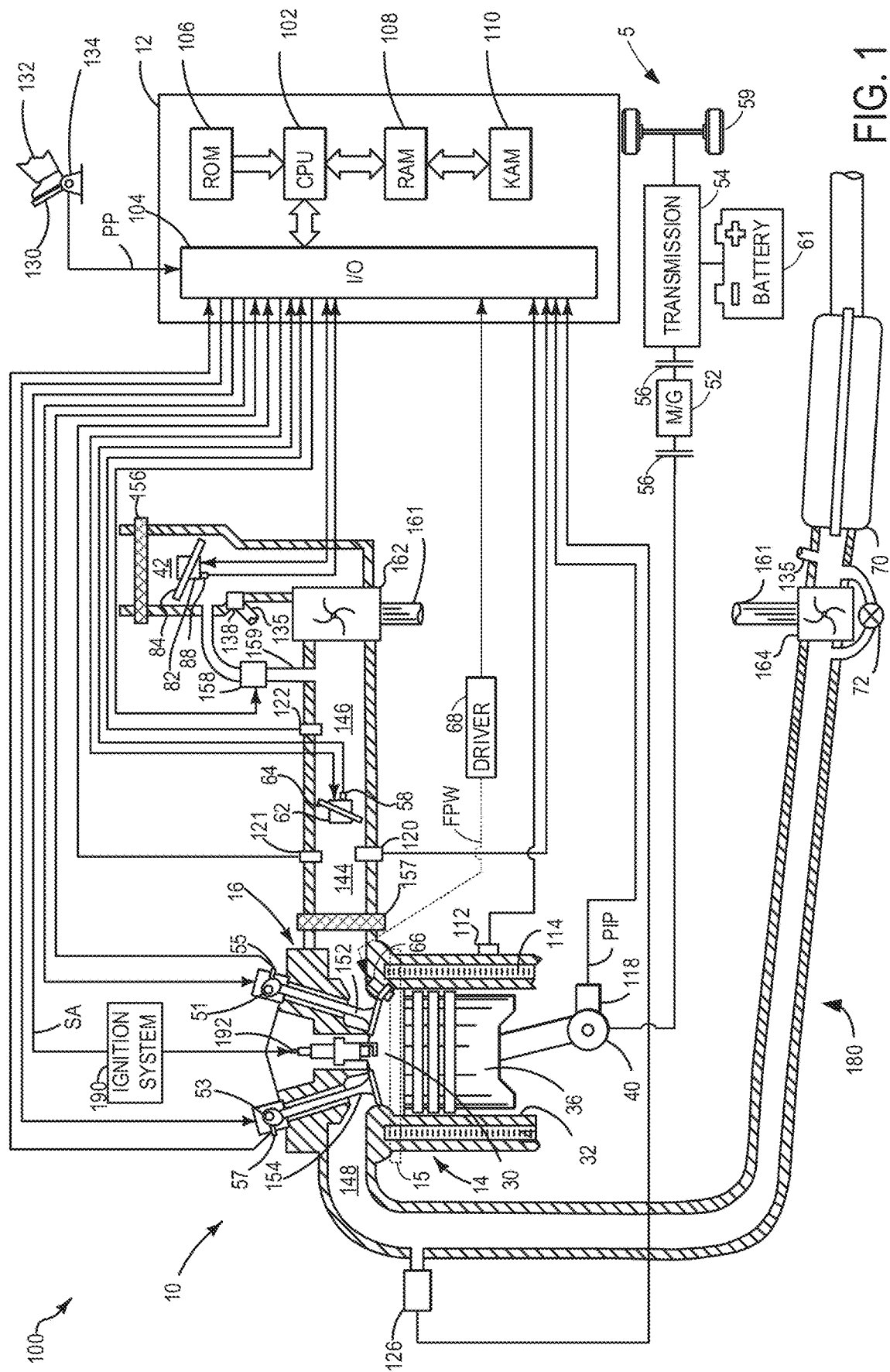
FIG. 1 shows an engine included in a hybrid vehicle.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket 15, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10. The gasket 15 may prevent leakage of fluids out of and/or into the combustion chamber 30 while under compression. The gasket 15 may further be shaped to admit one or more fluids to flow from the cylinder block 14 to the cylinder head 16. As will be described in greater detail below, the gasket 15 may comprise one or more pressure relief device integrally formed therein such that fluids flowing from the cylinder block 14 to the cylinder head 16 may be depressurized.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressure can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112.

FIG. 2 illustrates a perspective schematic view of a head gasket 200 according to an embodiment. The head gasket 100 may be used as the gasket 15 in the engine 10 as illustrated in FIG. 1. The head gasket 200 is illustrated for use with a four cylinder engine; however, it may be reconfigured for use with an engine having more or less than four cylinders, and for use with engines in various configurations including in-line cylinders, a v-configuration engine, and the like.

The gasket 200 has a first side 202 that mates with a deck face of a cylinder head (e.g., cylinder head 16 of FIG. 1) and a second opposed side that mates with a deck face of a cylinder block (e.g., cylinder block 14 of FIG. 1) of the engine. The head gasket defines apertures 204 and gasket beads 206 that surround each cylinder in the engine to seal the cylinder. The head gasket may also have various apertures 208 therethrough that allows for the flow of intake gases, exhaust gases, coolant, and/or lubricant from the block to the head or vice versa and across the gasket. The gasket also defines various apertures 210 such as bolt holes that allow a head bolt to pass through the gasket when connecting a cylinder head to the cylinder block.

In one example, the gasket 200 is constructed from multiple layers, and each layer may be made from steel or another suitable material. For example, the gasket 200 may be a multi-layer steel (MLS) gasket. In various examples, the layers may all be formed from the same material or may be formed from different materials or alloys. Each layer may be stamped or otherwise processed to provide features associated with the layer such as apertures 208, 210, gasket beads 206, and the like.

In one example, the gasket 200 is configured for use with a diesel engine. A diesel engine may demand robust sealing by the gasket based on the high combustion pressures and high thermal loads that occur during engine operation. In one example, the diesel engine may be a light or medium duty engine and experience compression ratios above 14:1, with compression ratios up to or above 23:1. Peak operating pressure in-cylinder in the engine may be 170 bar or more for a naturally aspirated engine, and higher peak pressures for a forced induction engine. However, it will be appreciated that the gasket 200 may also be shaped for spark-ignited engines or the like.

Turning now to FIG. 3A, it shows an embodiment 300 of a multi-layered gasket 310, which may be used similarly to gasket 200 of FIG. 2. As such, components previously introduced may be similarly numbered in subsequent figures. A fluid, shown by arrows 302, may flow between a first layer 312 and a second layer 314 (e.g., first side 202 and second side of FIG. 2) in a passage 316 of the MLS gasket 310. The passage 316 may correspond to an interstitial space arranged between the first 312 and second 314 layers.

The passage 316 may be fluidly coupled to one or more of the apertures (e.g., apertures 208) that enable fluid flow from the block to the head or vice-versa. That is to say, as fluid flows from a block side adjacent second side 314 to a head side adjacent first side 312 or vice-versa, a portion of the fluid may be diverted in a direction angled to its original flow direction and enter the passage 316. In one example, the diverted direction is perpendicular to the original direction. As such, the passage 316, and therefore the interstitial space formed between the layers of the multi-layered gasket 310 may flow fluids in a direction generally perpendicular to its original flow.

The passage 316 may direct the fluid to a pressure relief device 320 of the multi-layered gasket 310. In some examples, fluid may only flow through interstitial spaces of the multi-layered gasket where the pressure relief device 320 located. Thus, the multi-layered gasket 310 may comprise a hollow interstitial space arranged between and completely separating the first side 312 and the second side 314, however, the passage 316 may only be arranged at portions of the interstitial space where the pressure relief device 320 is arranged. Thus, in one example, the portions of the hollow interstitial space where the pressure relief device 320 is not arranged may be hermetically sealed from the apertures and may not receive fluid. Additionally or alternatively, the interstitial space may receive fluid throughout, wherein the fluid may exit the multi-layered gasket 310 via only the pressure relief device 320 or the apertures 208 of FIG. 2.

The pressure relief device 320 may operate via a ball-spring mechanism, wherein a spring 322 may be physically coupled to a ball 324. Thus, in one example, the pressure relief device 320 is a spring valve. The spring 322 may be calibrated to a predetermined pressure such that in the presence of a fluid comprising a pressure less than the predetermined pressure, the spring 322 may press the ball 324 against interior surfaces of the first and second layers 312, 314, thereby preventing fluid flow through an outlet 326, as illustrated in the embodiment of FIG. 3A. In this way, fluid may flow and contact the ball 324, without flowing out of the multi-layered gasket 310. The predetermined pressure may be based on one or more engine operating conditions including engine RPM, oil viscosity, and the like. Additionally or alternatively, the predetermined pressure may be correlated to a predetermined temperature, wherein the spring 322 may be forced open in response to a fluid temperature being greater than or equal to the predetermined pressure. The open position is illustrated in FIG. 3B.

Turning now to FIG. 3B, it shows an embodiment 350 of the MLS gasket 310, wherein the pressure relief device 320 is in an open position. As shown, the spring 322 is compressed and the ball 324 is moved away from the interior surfaces of the first and second sides 312, 314. The open position may occur in response to a fluid pressure being greater than or equal to the predetermined pressure. As such, the fluid may overcome a force of the spring 322 and move the ball 324 toward the outlet 326, thereby compressing the spring 322. The fluid may flow through the outlet 326 and out of the engine (e.g., engine 10 of FIG. 1). In one example, if the fluid is a lubricant, such as oil, then the fluid may flow to an oil pan from the outlet 326. As another example, if the fluid is a coolant, such as water, then the fluid may flow to a radiator from the outlet 326. As another example, additionally or alternatively, if the fluid is a gas, such as exhaust-gas recirculate (EGR), then the gas may flow from the outlet 326 to an EGR passage, an intake passage, and an exhaust passage. As described above, the apertures 208 may be shaped to flow a variety of fluids from the block to the head. As such, a plurality of the pressure relief device 320 may be arranged in the multi-layered gasket 310 in area corresponding to the locations of the apertures 208.

Turning now to FIG. 4A, it shows an embodiment 400 of the multi-layered gasket 310. The embodiment 400 may be substantially similar to the embodiment 300 in that each embodiment comprises the first layer 312, the second layer 314, and the internal passage 316. However, the embodiment 400 may differ from the embodiment 300 in that a pressure relief device 420 may be different than the pressure relief device 320. The pressure relief device 420 may comprise a flexible sheet 422 arranged between the first and second layers 312, 314 along the passage 316. The flexible sheet 422 may comprise a fixed end 424, which may be physically coupled to and in face-sharing contact with an interior surface of the first side 312. The fixed end 424 may be physically coupled to the interior surface of the first side 312 via one or more of a weld, a fusion, an adhesive, and a fastener. Fluid may not flow between the fixed end 424 and the interior surface of the first side 312. As such, the fixed end 424 may be hermetically sealed with the interior surface of the first side 312 and may be immovable.

The flexible sheet 422 may further comprise a free end 426 which may be in face-sharing contact with an interior surface of the second side 314 during some conditions of the pressure relief device 420. In the example of FIG. 4A, a pressure exerted by a fluid flow, shown by arrows 402, may not be sufficient to move the free end 426 away from the interior surface of the second side 314. That is to say, a pressure of the fluid flow may be less than the predetermined pressure, and the flexible sheet 422 may remain in a closed position, where the free end 426 is pressed against the interior surface of the second side 314, thereby sealing the passage 316 and preventing fluid from flowing to an outlet 428.

As shown, the flexible sheet 422 comprises a bent portion wherein the bent portion crosses a central axis 499 of the passage 316, wherein the central axis 499 is parallel to a general direction of fluid flow 402. The bent portion may illustrate a transition of the flexible sheet 422, wherein the flexible sheet 422 may begin to move and/or lift at the bent portion or downstream of the bent portion at the free end 426.

Additionally or alternatively, a material of the flexible sheet 422 may be different than a material of the first side 312 and the second side 314. The first side 312 and the second side 314 may be formed of a rigid metal or the like, as described above. However, the flexible sheet 422 may comprise flexible steel or other flexible material based on desired operating pressures.

Turning now to FIG. 4B, it shows an embodiment 450 of the pressure relief device 420 in an open position. As such, a fluid flow in the passage 316 comprises a pressure greater than or equal to the predetermined pressure, thereby enabling the fluid to move the free end 426 of the flexible sheet 422 away from the interior surface of the second side 314. As such, the fluid may flow to the outlet 428 and outside of the engine (e.g., engine 10 of FIG. 1). In one example, the flexible sheet 422 may pivot about an axis extending through the physically coupling between the fixed end 424 and the interior surface of the first side 312 in a direction perpendicular to fluid flow 402. Once the fluid pressure decreases to a pressure less than the predetermined pressure, the flexible sheet 422 may return to the closed position and the free end 426 may press against the interior surface of the second side 314.

In this way, a multi-layer gasket may be fitted with a pressure relief device which may control and/or adjust a fluid flow from a cylinder block to a cylinder head. The pressure relief device may utilize a space between layers of the gasket to decrease packaging constraints. The technical effect of arranging the pressure relief device in the multi-layer gasket is to decrease packaging constraints due to valves arranged in or around the block and/or head to adjust fluid flow therebetween.

An embodiment of a system comprising an engine comprising a cylinder head and a cylinder block with a multi-layered gasket arranged between the cylinder head and the cylinder block, the multi-layered gasket comprising an interstitial space between layers shaped to flow fluids toward a pressure relief device integrally formed within the multi-layered gasket. A first example of the system further includes where the interstitial space is fluidly coupled to one or more apertures formed in the multi-layered gasket, wherein the one or more apertures are shaped to direct fluid flow from the cylinder block to the cylinder head or vice-versa. A second example of the system, optionally including the first example, further includes where the fluid flow is one or more of a lubricant, gas, and coolant. A third example of the system, optionally including the first and/or second examples, further includes where there are no electronic devices coupled to the pressure relief device, and where the multi-layered gasket is a multi-layered steel gasket. A fourth example of the system, optionally including one or more of the first through third examples, further includes where the pressure relief device is in a closed position in response to a pressure of a fluid being less than a predetermined pressure. A fifth example of the system, optionally including one or more of the first through fourth examples, further includes where the pressure relief device is in an open position in response to a pressure of a fluid being greater than or equal to the predetermined pressure. A sixth example of the system, optionally including one or more of the first through fifth examples, further includes where the pressure relief device comprises an outlet fluidly coupled to one or more of an oil pan, a radiator, a water reservoir, an intake passage, an exhaust passage, and an exhaust-gas recirculation passage. A seventh example of the system, optionally including one or more of the first through sixth examples, further includes where the pressure relief device comprises a ball and a spring, and where the ball is pressed against interior surfaces of the multi-layer gasket during a closed position, and where the ball is spaced away from interior surfaces of the multi-layer gasket during an open position. An eighth example of the system, optionally including one or more of the first through seventh examples, further includes where the pressure relief device comprises a flexible layer, and where a free end of the flexible layer is pressed against an interior surface of a block side of the multi-layer gasket during a closed position, and where the free end is spaced away from the interior surface of the block side during an open position.

An embodiment of a gasket comprising a first side facing a cylinder head and a second side facing a cylinder block, where the first side and the second side are separated by a space, and a pressure relief device comprising a moveable portion shaped to fluidly couple the space to a component arranged outside of an engine. A first example of the gasket further comprises where the moveable portion is a ball, and where the ball is physically coupled to a spring shaped to press the ball against interior surfaces of the first side and the second side to seal the space in response to a pressure of a fluid being less than a predetermined pressure. A second example of the gasket, optionally including the first example, further includes where the spring compresses and moves the ball away from the interior surfaces of the first side and the second side in response to the pressure of the fluid being greater than or equal to the predetermined pressure. A third example of the gasket, optionally including the first and/or second examples, further includes where the moveable portion is a metal sheet, and where the metal sheet comprises a fixed end physically coupled to the first side, and where a free end is in face-sharing contact with the second side in response to a pressure of a fluid being less than a predetermined pressure. A fourth example of the gasket, optionally including one or more of the first through third examples, further includes where the metal sheet pivots relative to the fixed end and moves the free end away from the second side in response to the pressure of the fluid being greater than or equal to the predetermined pressure. A fifth example of the gasket, optionally including one or more of the first through fourth examples, further includes where the component is one or more of an oil pan, a radiator, an intake passage, an exhaust passage, and an exhaust-gas recirculation passage.

An embodiment of an engine comprising a multi-layer gasket arranged between a cylinder head and a cylinder block, the multi-layer gasket comprising a plurality of apertures for flowing a fluid from the cylinder block to the cylinder head, and where the multi-layer gasket comprises at least one passage arranged in a space between a first layer and a second layer, and where the at least one passage is shaped to receive the fluid from an aperture of the plurality of apertures in a direction perpendicular to an original direction of fluid flow, and where the at least one passage comprises a pressure relief device. A first example of the engine optionally including where the at least one passage is one of a plurality of passages shaped to flow fluid to a plurality of the pressure relief device, and where the plurality of passages receives different fluids from different apertures of the plurality of apertures, and where the fluids include exhaust gas, coolant, and lubricant, and where the fluids do not mix. A second example of the engine, optionally including the first example, further includes where the pressure relief device is integrally formed within the multi-layer gasket, and where an outlet of the pressure relief device directs the fluids from outside of the engine. A third example of the engine, optionally including the first and/or second examples, further includes where the pressure relief device is a spring valve or flexible sheet, and where one or more of the spring valve and the flexible sheet are arranged in the multi-layer gasket. A fourth example of the engine, optionally including one or more of the first through third examples, further includes where the flexible sheet is a third layer of the multi-layer gasket arranged between the first and second layers, and where the third layer contacts each of the first and second layers and comprises a bend.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an engine comprising a cylinder head and a cylinder block with a multi-layer gasket arranged between the cylinder head and the cylinder block, the multi-layer gasket comprising an interstitial space between layers shaped to flow fluids toward a pressure relief device integrally formed within the multi-layer gasket, wherein the pressure relief device comprises a ball and a spring, and where the ball is pressed against interior surfaces of the multi-layer gasket when in a closed position, and where the ball is spaced away from interior surfaces of the multi-layer gasket when in an open position.

2. The system of claim 1, wherein the interstitial space is fluidly coupled to one or more apertures formed in the multi-layer gasket, wherein the one or more apertures are shaped to direct a fluid flow from the cylinder block to the cylinder head or vice-versa.

3. The system of claim 2, wherein the fluid flow is one or more of a lubricant, gas, and coolant.

4. The system of claim 1, wherein there are no electronic devices coupled to the pressure relief device, and where the multi-layer gasket is a multi-layer steel gasket.

5. The system of claim 1, wherein the pressure relief device is in the closed position in response to a pressure of a fluid being less than a predetermined pressure.

6. The system of claim 5, wherein the pressure relief device is in the open position in response to a pressure of a fluid being greater than or equal to the predetermined pressure.

7. The system of claim 1, wherein the pressure relief device comprises an outlet fluidly coupled to one or more of an oil pan, a radiator, a water reservoir, an intake passage, an exhaust passage, and an exhaust-gas recirculation passage.

8. A gasket comprising:
a first side facing a cylinder head and a second side facing a cylinder block, where the first side and the second side are separated by a space; and
a pressure relief device comprising a moveable portion shaped to fluidly couple the space to a component arranged outside of an engine, wherein the moveable portion is a metal sheet, and wherein the metal sheet comprises a fixed end physically coupled to the first side, and where a free end is in face-sharing contact with the second side in response to a pressure of a fluid being less than a predetermined pressure.

9. The gasket of claim 8, wherein the metal sheet pivots relative to the fixed end and moves the free end away from the second side in response to the pressure of the fluid being greater than or equal to the predetermined pressure.

10. The gasket of claim 8, wherein the component is one or more of an oil pan, a radiator, an intake passage, an exhaust passage, and an exhaust-gas recirculation passage.

11. An engine comprising:
a multi-layer gasket arranged between a cylinder head and a cylinder block, the multi-layer gasket comprising a plurality of apertures for flowing a fluid from the cylinder block to the cylinder head, and where the multi-layer gasket comprises at least one passage arranged in a space between a first layer and a second layer, and where the at least one passage is shaped to receive the fluid from an aperture of the plurality of apertures in a direction perpendicular to an original direction of fluid flow, and where the at least one passage comprises a pressure relief device, wherein the pressure relief device is a spring valve or a flexible sheet, and wherein one or more of the spring valve and the flexible sheet are arranged in the multi-layer gasket.

12. The engine of claim 11, wherein the at least one passage is one of a plurality of passages, and wherein the pressure relief device is one of a plurality of pressure relief devices, wherein the plurality of passages are shaped to flow fluids to the plurality of the pressure relief devices, and where the plurality of passages receives different fluids from different apertures of the plurality of apertures, and where the fluids include exhaust gas, coolant, and lubricant, and where the fluids do not mix.

13. The engine of claim 11, wherein the pressure relief device is integrally formed within the multi-layer gasket, and where an outlet of the pressure relief device directs the fluids from outside of the engine.

14. The engine of claim 11, where the flexible sheet is a third layer of the multi-layer gasket arranged between the first and second layers, and where the third layer contacts each of the first and second layers and comprises a bend.

* * * * *